US012438485B2

(12) United States Patent
Agarwal (10) Patent No.: US 12,438,485 B2
(45) Date of Patent: Oct. 7, 2025

(54) DRIVE SIGNAL GENERATION FOR MOTOR (71) Applicant: Infineon Technologies Austria AG, Villach (AT)

(72) Inventor: Nitin Agarwal, Torrance, CA (US)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 202 days.

(21) Appl. No.: 18/373,542

(22) Filed: Sep. 27, 2023

(65) Prior Publication Data
US 2025/0105767 A1    Mar. 27, 2025

(51) Int. Cl.
H02P 21/00 (2016.01)
H02P 21/10 (2016.01)
H02P 21/18 (2016.01)

(52) U.S. Cl.
CPC .............. H02P 21/10 (2013.01); H02P 21/18 (2016.02); H02P 2207/05 (2013.01)

(58) Field of Classification Search
CPC .. H02P 21/10; H02P 21/18; H02P 6/16; H02P 6/17; H02P 2207/05; H02P 21/22; H02P 25/022; H02P 27/08; H02P 27/06; H02P 21/00; H02P 6/08
See application file for complete search history.

(56) References Cited

U.S. PATENT DOCUMENTS 11,316,460 B2 * 4/2022 Dixon ................ H02P 6/182

* cited by examiner

Primary Examiner — Karen Masih
(74) Attorney, Agent, or Firm — Cooper Legal Group LLC (57) ABSTRACT According to some embodiments, a method for controlling a motor comprises receiving mechanical angle data and electrical angle data representing a position of the motor, setting an encoder offset between the mechanical angle data and the electrical angle data, determining extremum values of a phase current of the motor, adjusting the encoder offset based on the extremum values to generate an adjusted encoder offset, determining an estimated motor position and an estimated motor speed based on the mechanical angle data, the electrical angle data, and the adjusted encoder offset, and generating a drive signal for the motor based on the estimated motor position and the estimated motor speed.

20 Claims, 6 Drawing Sheets

DRIVE SIGNAL GENERATION FOR MOTOR

TECHNICAL FIELD

The present disclosure relates generally to motor control.

BACKGROUND

Permanent Magnet Synchronous Motors (PMSMs) are employed in consumer and industrial motor applications due to their higher reliability and smaller size compared to other types of motors. To achieve high efficiency and low vibration and acoustic noise, Field-Oriented Control (FOC) techniques are often used in consumer and industrial PMSM control for cordless power tools, automated guided robots, cordless gardening tools, eBikes, drones, robotics, fans, pumps, compressors, geared motors, and the like.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method for controlling a motor comprises receiving mechanical angle data and electrical angle data representing a position of the motor, setting an encoder offset between the mechanical angle data and the electrical angle data, determining extremum values of a phase current of the motor, adjusting the encoder offset based on the extremum values to generate an adjusted encoder offset, determining an estimated motor position and an estimated motor speed based on the mechanical angle data, the electrical angle data, and the adjusted encoder offset, and generating a drive signal for the motor based on the estimated motor position and the estimated motor speed.

According to some embodiments, a system for controlling a motor comprises means for receiving mechanical angle data and electrical angle data representing a position of the motor, means for setting an encoder offset between the mechanical angle data and the electrical angle data, means for determining extremum values of a phase current of the motor, means for adjusting the encoder offset based on the extremum values to generate an adjusted encoder offset, means for determining an estimated motor position and an estimated motor speed based on the mechanical angle data, the electrical angle data, and the adjusted encoder offset, and means for generating a drive signal for the motor based on the estimated motor position and the estimated motor speed.

According to some embodiments, a motor controller configured to generate a drive signal for a motor comprises a position interface configured to receive a first pulse indicative of a rotation of the motor and a second pulse indicative of an angular position of the motor, an encoder calibration unit configured to set an encoder offset between the first pulse and a zero positon reference associated with the second pulse, determine extremum values of a phase current of the motor, and adjust the encoder offset based on the extremum values to generate an adjusted encoder offset, an angle and speed unit configured to determine an estimated motor position and an estimated motor speed based on the first pulse, the second pulse, and the adjusted encoder offset, and a pulse width modulation unit configured to generate a drive signal for the motor based on the estimated motor position and the estimated motor speed.

According to some embodiments, a system comprises a motor, an angle sensor interfacing with the motor to generate a first pulse indicative of a rotation of the motor and a second pulse indicative of an angular position of the motor, a motor controller, comprising an encoder calibration unit configured to set an encoder offset between the first pulse and a zero positon reference associated with the second pulse, determine extremum values of a phase current of the motor, and adjust the encoder offset based on the extremum values to generate an adjusted encoder offset, an angle and speed unit configured to determine an estimated motor position and an estimated motor speed based on the first pulse, the second pulse, and the adjusted encoder offset, and a pulse width modulation unit configured to generate a drive signal for the motor based on the estimated motor position and the estimated motor speed.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

Field-Oriented Control (FOC) is a method of variable speed control for three-phase alternating current (AC) electric motors to improve power efficiency with fast control response over a full range of motor speeds. Various implementations of structures, components, and techniques for providing control of three-phase AC motors are discussed herein. Structures, components, and techniques are discussed with reference to example three-phase Permanent Magnet Synchronous Motor (PMSM) devices and control systems. However, this discussion is not intended to be limiting, and is for ease of discussion and illustrative convenience. The techniques and devices disclosed may be applied to other motor designs, control structures, and/or the like (e.g., single-phase and three-phase variable frequency drives, digital phase converters, three-phase and single-phase motors, brushless DC motors, induction motors, regenerative drives, direct torque control drives, etc.), and remain within the scope of the disclosure.

Figure 1A:
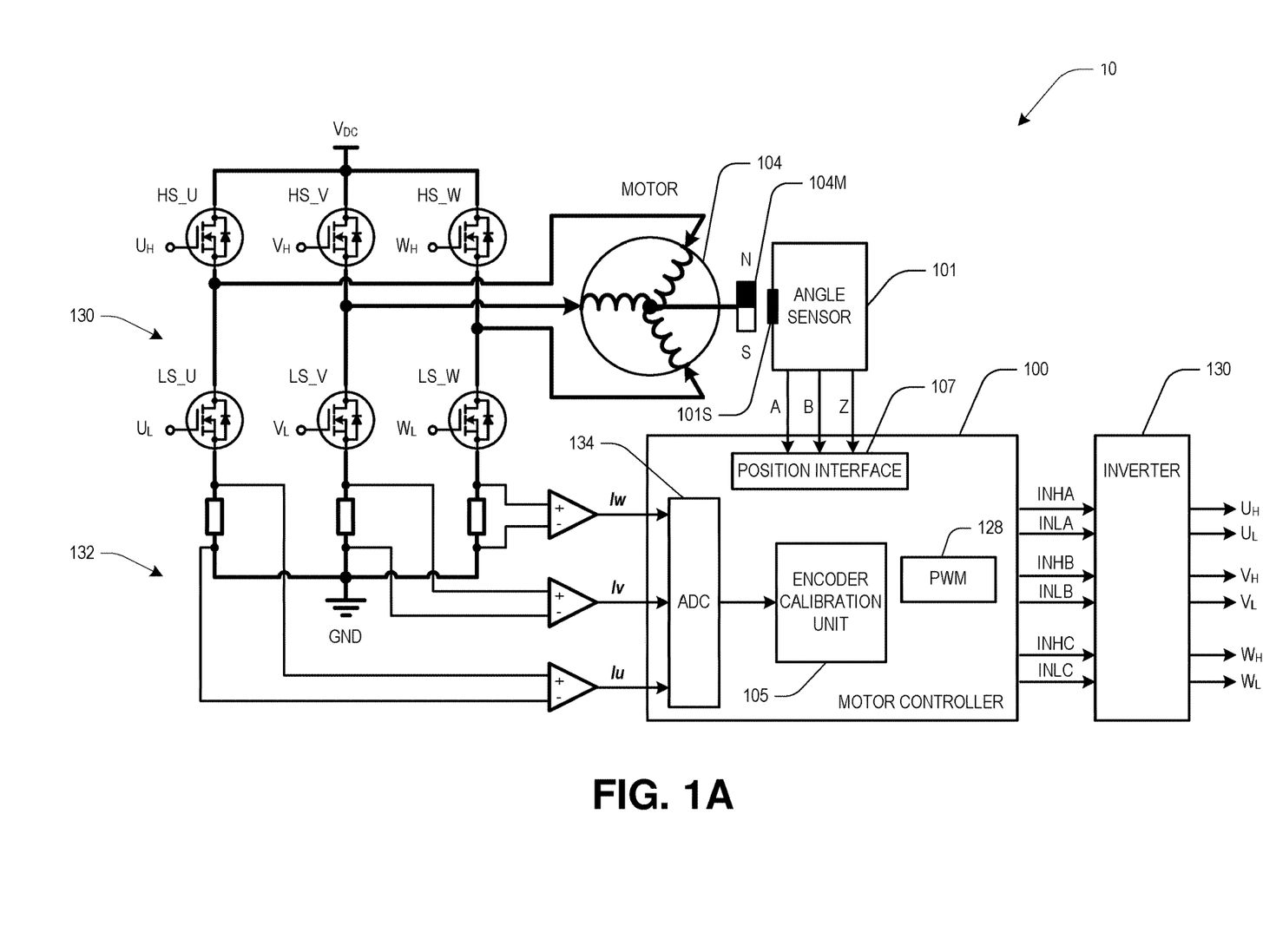
FIGS. 1A and 1B are schematic diagrams of a motor system, according to some embodiments.
Figure 1B:
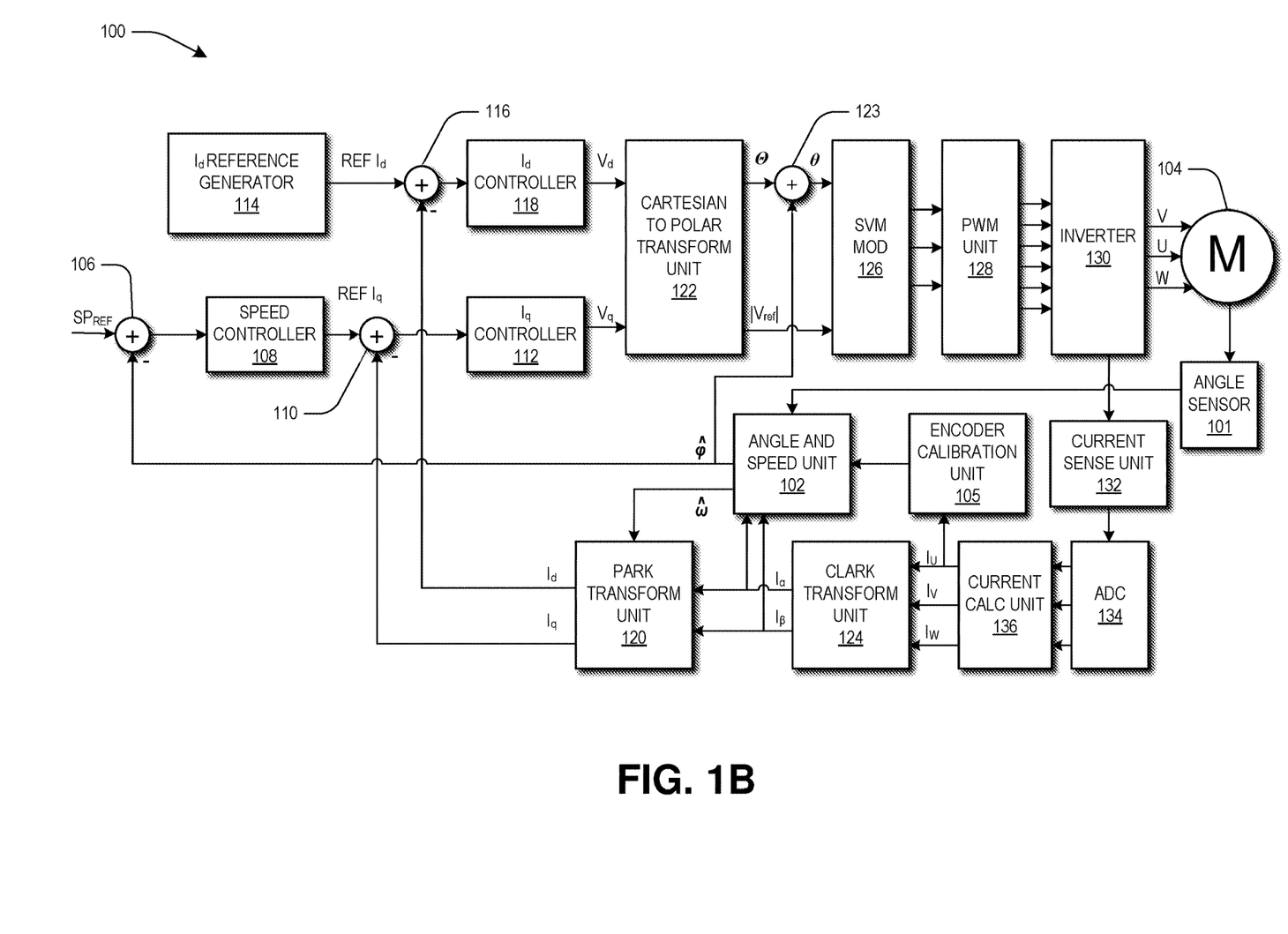

FIGS. 1A and 1B are schematic diagrams of a motor system 10, according to some embodiments. In some embodiments, the motor system 10 includes a motor controller 100 that uses an angle sensor 101 and an angle and speed unit 102 to estimate a rotor position, @, and a rotor speed, @, to support FOC techniques for controlling a motor 104. The motor controller 100 may be implemented by a microcontroller unit. Rotor speed is indicative of motor speed. In some embodiments, the angle sensor 101 comprises a magnetic sensor 101S that detects a Z pulse from a magnet 104M mounted to a shaft of the motor 104 that signals a mechanical revolution of the shaft and also detects A and B pulses from the magnets of the rotor. The rotor magnets are arranged in pole pairs, and the number of pulses per revolution depends on the number of pole pairs. For example, the motor 104 may comprise 15 pole pairs and the angle sensor 101 provides 4096 encoder pulses per revolution, resulting in 16,384 ticks per revolution.

To provide optimum torque from the motor 104, the Z encoder pulse must be aligned with the 0-degree electrical angle reference for the A and B pulses. Each motor 104 has a unique encoder offset that must be corrected to achieve optimum torque. If the encoder offset is not corrected, more phase current ($I_U$, $I_V$, $I_W$) will flow to achieve the same amount of torque. If the permanent magnetic field is not uniform due to any reason like some of the permanent magnets of motor are broken or there is a big difference in their magnetic field intensity, the toque will not be smooth. These variations in the torque produce torque ripple. In some embodiments, the motor controller 100 comprises an encoder calibration unit 105, that accounts for the offset between the mechanical Z pulse and the zero point for the electrical angle reference for the A and B pulses received at a position interface 107.

The goal of the motor controller 100 is to achieve smooth operation from zero speed to maximum speed of the motor 104 even at different and unknown time-varying disturbances. Using a PMSM motor as an example, the continuous-time voltage equations of the PMSM in the d-q coordinate system (where the d-axis is aligned with the magnetic axis of the motor permanent magnets, and the q-axis is perpendicular to the d-axis) are:

$$V_d = RI_d + L_d \frac{dI_d}{dt} - \omega L_q I_q \text{ and} \quad (1)$$

$$V_q = RI_q + L_q \frac{dI_q}{dt} + \omega L_d I_d + \omega \Psi, \quad (2)$$

where:
- $V_d$ and $V_q$ are the d-axis and q-axis voltages (unit Volts),
- $I_d$ and $I_q$ are the d-axis and q-axis currents (Amperes),
- R is the stator winding resistance (Ohm),
- $L_d$ and $L_q$ are the d-axis and q-axis stator winding inductances (Henry),
- $\omega$ is the electrical speed corresponding to frequency of stator current, and rotor speed (rad/s), and
- $\Psi$ is the permanent magnet flux linkage (Weber).

To implement FOC control, the motor controller 100 uses a Park transform to convert between a D-Q rotor fixed reference frame defined by a torque generating component, Q, and a flux generating component, D, and an α-β stationary reference frame and a Clarke transform to convert between a three-phase reference frame defined by V, U, and W components to the α-β stationary reference frame. The α-β stationary reference frame signals are sinusoidal signals at steady state, and the D-Q rotor fixed reference frame signals are nearly constant at steady state. Park transforms, inverse Park transforms, Cartesian to Polar transforms, and Clarke transforms are known in the motor control art and are not described in greater detail herein.

In the three-phase reference frame, the U, V, and W components are separated by 120° and are stationary. In the α-β stationary reference frame, the components are electrically orthogonal and stationary. In the D-Q rotor fixed reference frame, the components are electrically orthogonal and rotating. For purposes of this description it is assumed that the motor 104 rotates in a positive direction, i.e., the counterclockwise direction, so the angles and angular speeds are positive numbers. The signs of the angles and angular speeds may be changed for a motor 104 that rotates in the negative direction, i.e., the clockwise direction. Coordinate systems may be referenced to the stator and/or the rotor of the motor 104. For example, the D-Q rotor fixed reference frame is fixed to the rotor and the components of the D-Q coordinate system rotate together. The direct axis of the D-Q rotor fixed reference frame is oriented in the direction from the rotor permanent magnet south pole(S) to north pole (N). The quadrature axis of the D-Q rotor fixed reference frame is perpendicular to the rotor flux (e.g., to the rotor).

The three-phase sinusoidal currents $I_U$, $I_V$, and $I_W$ of the motor stator windings are separated by 120° and generate three non-rotating, pulsating magnetic fields in the U, V, and W directions, respectively, resulting in a rotating magnetic field (stator flux space vector). Vector addition of $I_U$, $I_V$, and $I_W$ gives a current space vector. The magnitude of the current space vector may be scaled up or down with no change of direction for a motor rotating at speed, ω.

In the stationary α-β reference frame, the rotating stator flux space vector represents the rotating stator magnetic flux. Vector addition of the three-phase 120° separated stator phase voltages $V_U$, $V_V$, and $V_W$ defines a rotating voltage space vector. A rotating rotor permanent magnet generates a rotating rotor magnetic flux space vector. The magnitudes and directions of the above-mentioned rotating space vectors can be represented by radial coordinates and polar angles in polar coordinate systems. Techniques for transforming between the reference frames are known in the art.

Referring to FIG. 1B, a reference speed, $SP_{REF}$, representing a desired rotational speed for the motor 104, is received as an input and is provided to an adder 106 which also receives rotor speed, ω, feedback from the angle and speed unit 102 to generate an error signal for input to a speed controller 108. In some embodiments, the speed controller 108 is a proportional-integral (PI) controller that operates to drive its input error signal to zero. An output of the speed controller 108 is provided to an adder 110 that also receives a feedback torque generating current parameter ($I_q$). The adder 110 provides an input signal to an $I_q$ controller 112. In some embodiments, the $I_q$ controller 112 is a proportional-integral (PI) controller that operates to drive its input signal, which represents an error signal to zero.

A reference generator 114 provides a reference flux generating current parameter ($I_d$) as an input to an adder 116. The adder 116 also receives a feedback flux generating current parameter (Ia) and provides an error signal input to an $I_d$ controller 118. In some embodiments, the $I_d$ controller 118 is a proportional-integral (PI) controller that operates to drive its error input signal to zero. The $I_q$ controller 112 outputs a demand torque generating voltage parameter, $V_q$, and the $I_d$ controller 118 outputs a demand flux generating voltage parameter, Va. In some embodiments, the flux generating component $I_d$ is controlled to zero. In some embodiments, the flux generating component $I_d$ is controlled using a negative reference value to implement flux-weakening control to extend the operating speed range of the motor 104. In some embodiments, the flux generating component $I_d$ is controlled using a positive reference value to implement flux-boosting control.

The motor controller 100 comprises a Park transform unit 120, a Cartesian to polar transform unit 122, and a Clarke transform unit 124 to convert between reference frames. The Park transform unit 120 transforms the α-β stationary reference frame to the D-Q rotor fixed frame using a rotor speed, $\hat{\omega}$, from the angle and speed unit 102. The Cartesian to polar transform unit 122 transforms the D-Q rotor fixed frame to a polar reference frame designated by Θ and $|V_{ref}|$. The output, Θ, of the Cartesian to polar transform unit 122 is combined in an adder 123 with the rotor position, $\hat{\varphi}$, from the from the angle and speed unit 102. The Clarke transform unit 124 transforms the three-phase reference frame to the α-β stationary reference frame.

The Cartesian to polar transform unit 122 provides the polar reference signals to a space vector modulator 126. The space vector modulator 126 controls a pulse width modulation (PWM) unit 128 to generate three-phase PWM output signals to drive an inverter 130. The output signals of the inverter 130 drive the phases of the motor 104. In some embodiments, the inverter 130 comprises a three-phase two-level voltage inverter including high side switches HS_U, HS_V, HS_W and low side switches LS_U, LS_V, LS_W (see FIG. 1A).

A current sense unit 132 senses phase currents of the motor 104. In some embodiments, as illustrated in FIG. 1A, the current sense unit 132 comprises three shunt resistors associated with the three legs of the inverter 130 to sense the current of each phase of the motor 104, as illustrated in FIG. 1A. In some embodiments, two shunt resistors are used to sense the current of two phases of the motor 104. The current from the third phase of the motor 104 may be calculated based on the relationship $I_U+I_V+I_W=0$. In some embodiments, a single shunt resistor is inserted into to a DC link of the inverter 130 to sense a DC link current, and a three-phase current reconstruction is used to obtain the current information for each phase of the motor 104. In some embodiments, other sensors, such as motor phase in-line shunt resistors, Hall sensors, current transducers (e.g.: LEM current sensors), or other motor phase current sensors, may be used to obtain the current information for each phase of the motor 104.

An analog-to-digital converter (ADC) 134 receives the sensed voltages from the current sense unit 132 to generate digital inputs for a current calculation unit 136. The current calculation unit 136 generates phase current measurement parameters, $I_U$, $I_V$, and $I_W$. The phase current measurement parameters are provided to the Clarke transform unit 124 to generate α-β stationary reference frame feedback current parameters, $I_\alpha$, $I_\beta$. The stationary reference frame feedback current parameters are provided to the Park transform unit 120 to generate a feedback torque generating current parameter, $I_q$, and a feedback flux generating current parameter, $I_d$.

The angle and speed unit 102 estimates the rotor position, $\hat{\varphi}$, and the rotor speed, $\hat{\omega}$, using data from the angle sensor 101. One Z encoder pulse is received every one mechanical revolution. The mechanical angle increments at every tick generated from the A and B pulses. Electrical angle can be calculated based on the number of A and B pulses every revolution and the number of motor pole pairs. The encoder calibration unit 105 determines an encoder offset that compensates for the misalignment between the Z pulse and the zero angle reference generated out of ticks from the A and B pulses.

Some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design. In some embodiments, the motor 104, inverter 130, ADC 134, and the current sense unit 132 are hardware-implemented and the remaining units in FIG. 1B are software implemented. However, other combinations of hardware, firmware, or software are contemplated.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 2A:
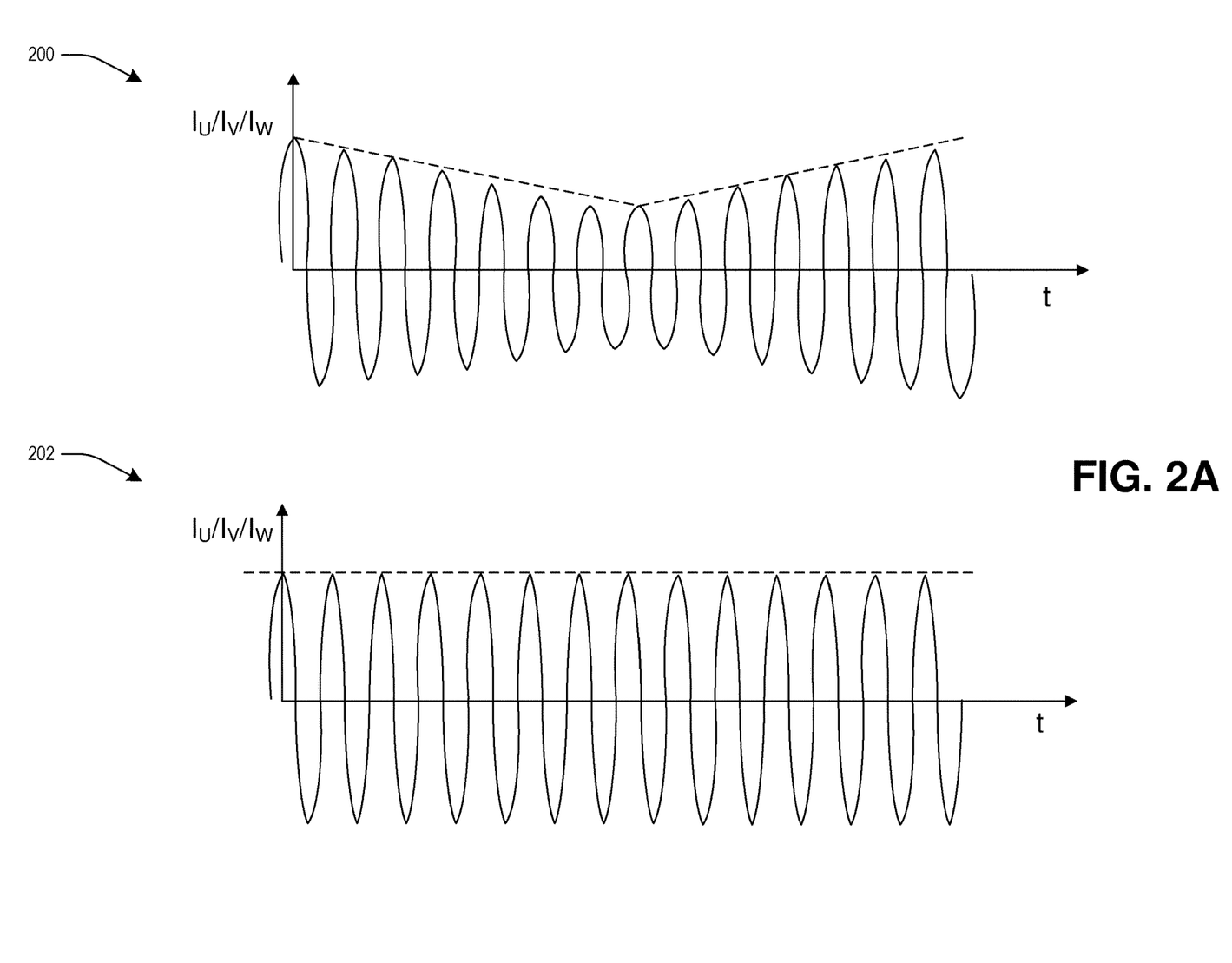
FIGS. 2A and 2B illustrates phase current plots for a motor, according to some embodiments.
Figure 2B:
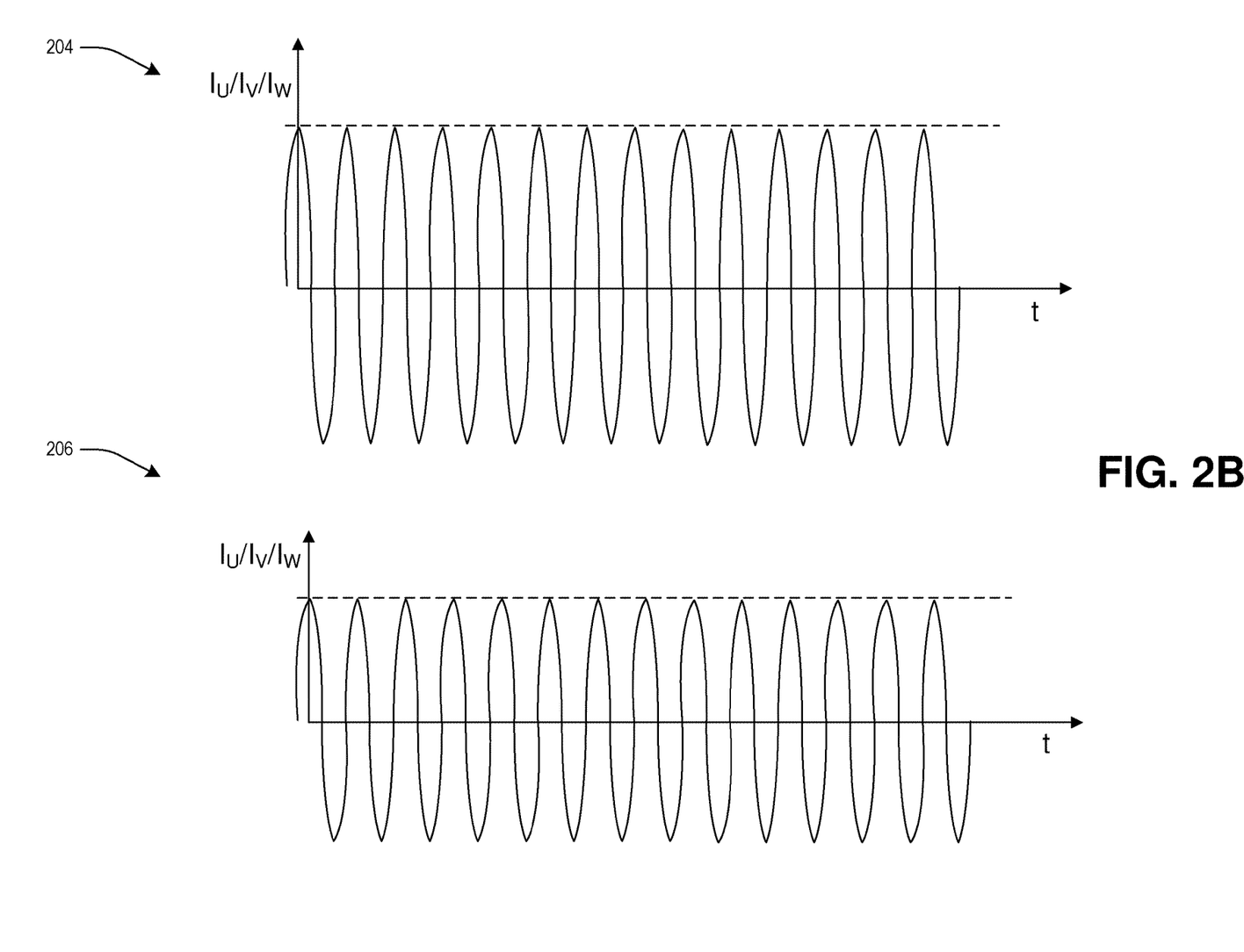

FIGS. 2A and 2B illustrate phase current plots 200, 202, 204, 206 for a motor, according to some embodiments. The plot 200 illustrates phase current ($I_U$, $I_V$, $I_W$) when the encoder offset is set at a value that does not align the zero reference of the A and B pulses with the Z pulse. The plot 200 is the specific case when the permanent magnetic field is not uniform in the motor. Note that the peak value of the phase current varies over time. The plot 202 illustrates the phase current ($I_U$, $I_V$, $I_W$) when the encoder offset is set at a value that aligns the zero-angle or zero-position position reference associated with the A and B pulses with the Z pulse, resulting in constant peak values and optimum torque.

Referring to FIG. 2B, the plot 204 illustrates phase current ($I_U$, $I_V$, $I_W$) when the encoder offset is set at a value that does not align the zero reference of the A and B pulses with the Z pulse. The plot 206 illustrates the phase current ($I_U$, $I_V$, $I_W$) when the encoder offset is set at a value that aligns the zero-angle or zero-position position reference associated with the A and B pulses with the Z pulse, resulting in reduced peak values and optimum torque.

Figure 3:
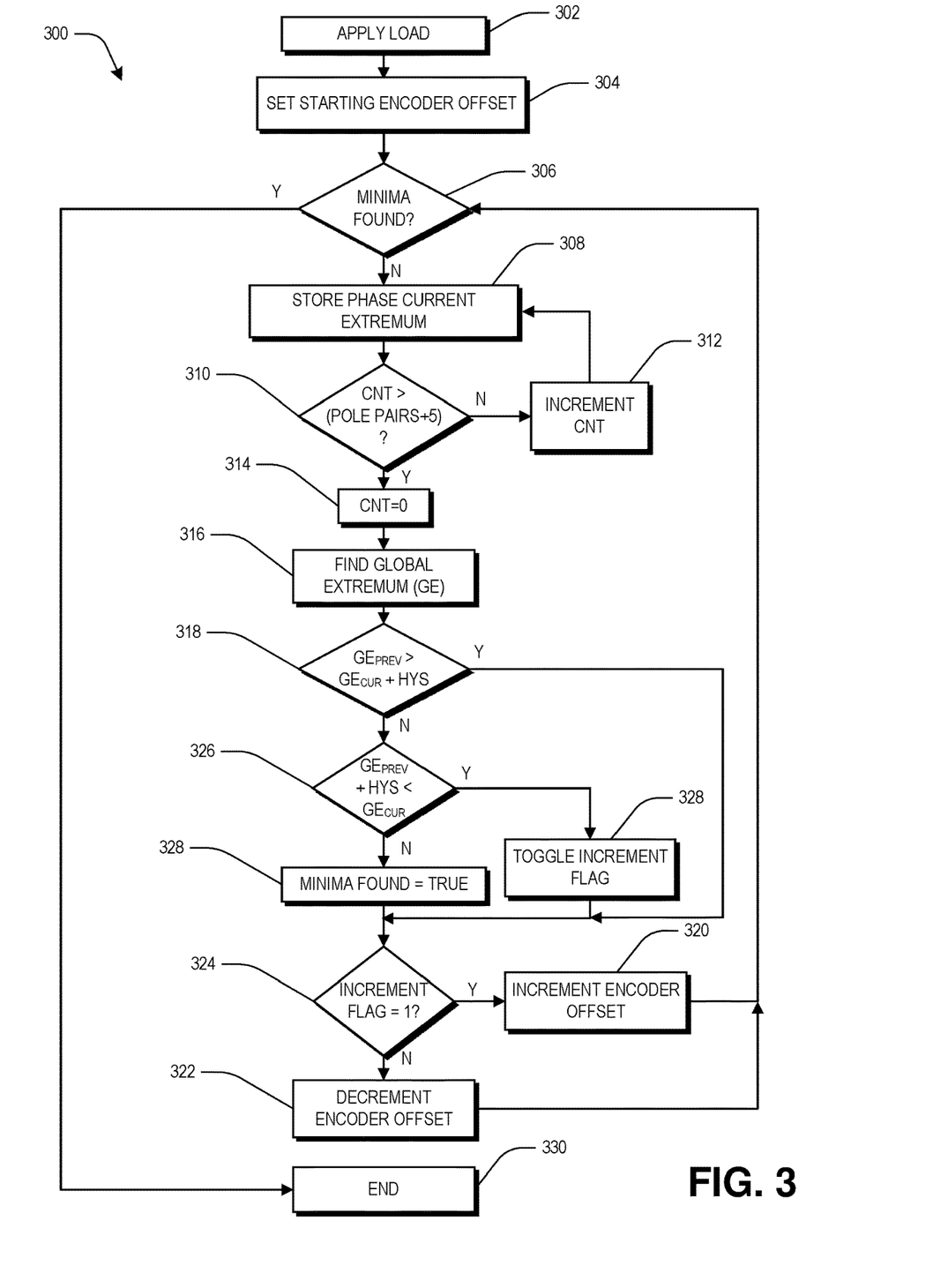
FIG. 3 illustrates a method for calibrating an angle sensor encoder offset in a motor controller, according to some embodiments.

FIG. 3 illustrates a method 300 for calibrating the angle sensor encoder offset in a motor controller, according to some embodiments. In some embodiments, the method 300 is implemented by the encoder calibration unit 105 of the motor controller 100. At 302 a load is applied to the motor 104. Sufficient load is applied such that peaks or valleys in the phase current are detectable. At 304, a starting encoder offset value is set for the angle and speed unit 102. In some embodiments, the starting encoder offset value is set to the previous value used by the motor controller 100. At 306, a determination is made if a minima condition is reached with respect to the encoder offset. The initial value of the minima flag is false. At 308, extremum values for the phase current are stored, for example, in an array indexed by a counter, CNT. In some embodiments, the extremum value may represent a value of the phase current at a peak or a value of the phase current at a valley. At 310, a determination is made whether the array counter, CNT, exceeds the number of pole pairs for the motor 104 by a predetermined amount, such as 5. If the condition at 310 is not met, the counter, CNT, is incremented at 312 and the array is populated at 308 until the condition at 310 is met. After the condition at 310 is met, the counter, CNT, is rest to zero at 314. At 316, the global extremum (GE) is found, such as the maximum peak value stored in the array or the maximum valley value stored in the array.

If the previous extremum value, $GE_{PREV}$, is greater than the current extremum value, $GE_{CUR}$, plus a hysteresis value, HYS, at 318, the encoder offset is either incremented at 320 or decremented at 322 based on a value of an increment flag determined at 324. Initially the increment flag is set to a first value, such as 1. If the value of the increment flag is 1 at 324, the encoder offset is incremented at 320. After incrementing the encoder offset at 320, the method 300 returns to 306 and iterates.

If the previous extremum value, $GE_{PREV}$, is not greater than the current extremum value, $GE_{CUR}$, plus the hysteresis value, HYS, at 318, a determination is made at 326 whether the previous extremum value, $GE_{PREV}$, plus the hysteresis value, HYS, is less than the current extremum value, $GE_{CUR}$. The condition at 326 indicates that an overshoot occurred and the encoder offset was incremented too far. The increment flag is toggled, for example from 1 to 0, at 328, resulting in a false condition at 324, the encoder offset being decremented at 322, and the method 300 returning to 306.

If the previous extremum value, $GE_{PREV}$, plus the hysteresis value, HYS, is not less than the current extremum value, $GE_{CUR}$, at 326, the current extremum value, $GE_{CUR}$, is within the hysteresis band, indicating that the minima has been reached and the encoder offset is optimized. The minima found flag is set at true at 328. Although the method flow shows the minima flag check at 306 in the linear flow, the minima check is actually performed continuously, and the method terminates at 330 immediately after the minima found flag is set at 328.

In some embodiments, an adaptive hysteresis approach may be used. For example, after the method 300 has converged to a value for the encoder offset, the hysteresis value may be reduced and the method 300 repeated iteratively until a minimum hysteresis is reached.

After completion of the method 300, the encoder offset is set at a value that aligns the zero reference of the A and B pulses with the Z pulse, resulting in constant peak values and optimum torque, as illustrated by the plot 202 in FIG. 2A or the plot 206 in FIG. 2B.

Figure 4:
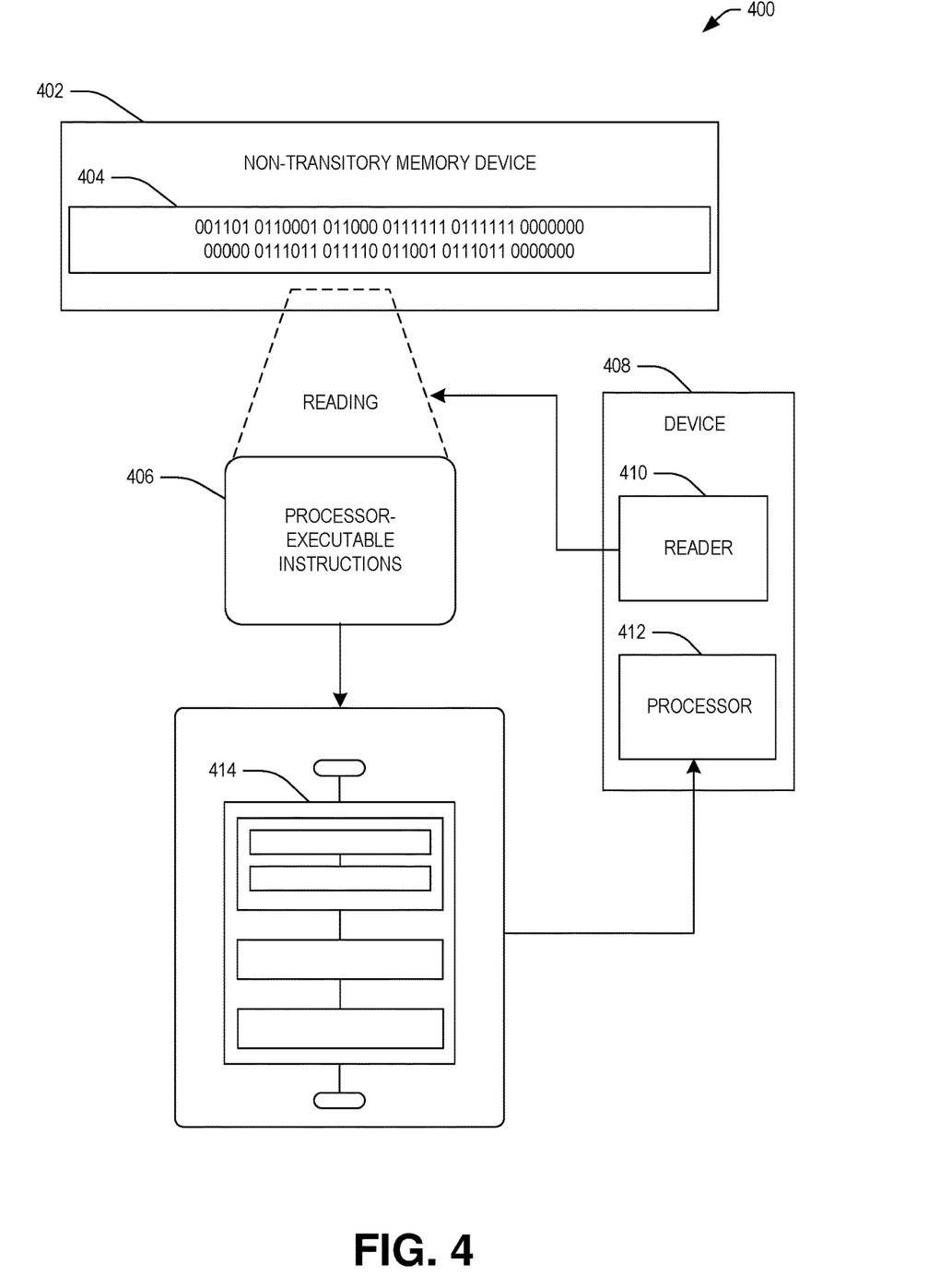
FIG. 4 illustrates an exemplary computer-readable medium, according to some embodiments.

FIG. 4 illustrates an exemplary embodiment 400 of a computer-readable medium 402, according to some embodiments. One or more embodiments involve a computer-readable medium comprising processor-executable instructions configured to implement one or more of the techniques presented herein. The embodiment 400 comprises a non-transitory computer-readable medium 402 (e.g., a CD-R, DVD-R, flash drive, a platter of a hard disk drive, etc.), on which is encoded computer-readable data 404. This computer-readable data 404 in turn comprises a set of processor-executable computer instructions 406 that, when executed by a computing device 408 including a reader 410 for reading the processor-executable computer instructions 406 and a processor 412 for executing the processor-executable computer instructions 406, are configured to facilitate operations according to one or more of the principles set forth herein. In some embodiments, the processor-executable computer instructions 406, when executed, are configured to facilitate performance of a method 414, such as at least some of the aforementioned method(s). In some embodiments, the processor-executable computer instructions 406, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a method for controlling a motor comprises receiving mechanical angle data and electrical angle data representing a position of the motor, setting an encoder offset between the mechanical angle data and the electrical angle data, determining extremum values of a phase current of the motor, adjusting the encoder offset based on the extremum values to generate an adjusted encoder offset, determining an estimated motor position and an estimated motor speed based on the mechanical angle data, the electrical angle data, and the adjusted encoder offset, and generating a drive signal for the motor based on the estimated motor position and the estimated motor speed.

According to some embodiments, the method comprises iterating the determining of the extremum values of the phase current and the adjusting of the encoder offset.

According to some embodiments, adjusting the encoder offset comprises incrementing the encoder offset responsive to a previous extremum value of the extremum values being greater than a current extremum value of the extremum values, and decrementing the encoder offset responsive to the previous extremum value of the extremum values being less than the current extremum value of the extremum values.

According to some embodiments, adjusting the encoder offset comprises incrementing the encoder offset responsive to a previous extremum value of the extremum values being greater than a sum of a current extremum value of the extremum values and a hysteresis value, and decrementing the encoder offset responsive to a sum of the previous extremum value of the extremum values and the hysteresis value being less than the current extremum value of the extremum values.

According to some embodiments, determining the extremum values comprises determining one of peak extremum values or valley extremum values.

According to some embodiments, the method comprises generating the mechanical angle data based upon an angle sensor relative to one or more magnets attached to a shaft of the motor.

According to some embodiments, the method comprises generating the electrical angle data based upon an angle sensor relative to one or more magnets attached to a rotor of the motor.

According to some embodiments, a motor controller configured to generate a drive signal for a motor comprises a position interface configured to receive a first pulse indicative of a rotation of the motor and a second pulse indicative of an angular position of the motor, an encoder calibration unit configured to set an encoder offset between the first pulse and a zero position reference associated with the second pulse, determine extremum values of a phase current of the motor, and adjust the encoder offset based on the extremum values to generate an adjusted encoder offset, an angle and speed unit configured to determine an estimated motor position and an estimated motor speed based on the first pulse, the second pulse, and the adjusted encoder offset, and a pulse width modulation unit configured to generate a drive signal for the motor based on the estimated motor position and the estimated motor speed.

According to some embodiments, the encoder calibration unit is configured to iterate the determining of the extremum values of the phase current and the adjusting of the encoder offset.

According to some embodiments, the encoder calibration unit is configured to adjust the encoder offset by incrementing the encoder offset responsive to a previous extremum value of the extremum values being greater than a current extremum value of the extremum values, and decrementing the encoder offset responsive to the previous extremum value of the extremum values being less than the current extremum value of the extremum values.

According to some embodiments, the encoder calibration unit is configured to adjust the encoder offset by incrementing the encoder offset responsive to a previous extremum value of the extremum values being greater than a sum of a current extremum value of the extremum values and a hysteresis value, and decrementing the encoder offset responsive to a sum of the previous extremum value of the extremum values and the hysteresis value being less than the current extremum value of the extremum values.

According to some embodiments, the encoder calibration unit is configured to determine the extremum values by determining one of peak extremum values or valley extremum values.

According to some embodiments, the position interface is configured to receive the first pulse based upon an angle sensor relative to one or more magnets attached to a shaft of the motor.

According to some embodiments, the position interface is configured to receive the second pulse based upon an angle sensor relative to one or more magnets attached to a rotor of the motor.

According to some embodiments, a system comprises a motor, an angle sensor interfacing with the motor to generate a first pulse indicative of a rotation of the motor and a second pulse indicative of an angular position of the motor, a motor controller, comprising an encoder calibration unit configured to set an encoder offset between the first pulse and a zero position reference associated with the second pulse, determine extremum values of a phase current of the motor, and adjust the encoder offset based on the extremum values to generate an adjusted encoder offset, an angle and speed unit configured to determine an estimated motor position and an estimated motor speed based on the first pulse, the second pulse, and the adjusted encoder offset, and a pulse width modulation unit configured to generate a drive signal for the motor based on the estimated motor position and the estimated motor speed.

According to some embodiments, the encoder calibration unit is configured to iterate the determining of the extremum values of the phase current and the adjusting of the encoder offset.

According to some embodiments, the encoder calibration unit is configured to adjust the encoder offset by incrementing the encoder offset responsive to a previous extremum value of the extremum values being greater than a current extremum value of the extremum values, and decrementing the encoder offset responsive to the previous extremum value of the extremum values being less than the current extremum value of the extremum values.

According to some embodiments, the encoder calibration unit is configured to adjust the encoder offset by incrementing the encoder offset responsive to a previous extremum value of the extremum values being greater than a sum of a current extremum value of the extremum values and a hysteresis value, and decrementing the encoder offset responsive to a sum of the previous extremum value of the extremum values and the hysteresis value being less than the current extremum value of the extremum values.

According to some embodiments, the encoder calibration unit is configured to determine the extremum values by determining one of peak extremum values or valley extremum values.

According to some embodiments, the angle sensor interfaces with one or more magnets attached to a shaft of the motor to generate the first pulse, and the angle sensor interfaces with one or more magnets attached to a rotor of the motor to generate the second pulse.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessary in some embodiments.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method for controlling a motor comprising:
   receiving mechanical angle data and electrical angle data representing a position of the motor;
   setting an encoder offset between the mechanical angle data and the electrical angle data;
   determining extremum values of a phase current of the motor;
   adjusting the encoder offset based on the extremum values to generate an adjusted encoder offset;
   determining an estimated motor position and an estimated motor speed based on the mechanical angle data, the electrical angle data, and the adjusted encoder offset; and
   generating a drive signal for the motor based on the estimated motor position and the estimated motor speed.

2. The method of claim 1, comprising:
   iterating the determining of the extremum values of the phase current and the adjusting of the encoder offset.

3. The method of claim 1, wherein:
   adjusting the encoder offset comprises:
   incrementing the encoder offset responsive to a previous extremum value of the extremum values being greater than a current extremum value of the extremum values; and
   decrementing the encoder offset responsive to the previous extremum value of the extremum values being less than the current extremum value of the extremum values.

4. The method of claim 1, wherein:
   adjusting the encoder offset comprises:
   incrementing the encoder offset responsive to a previous extremum value of the extremum values being greater than a sum of a current extremum value of the extremum values and a hysteresis value; and
   decrementing the encoder offset responsive to a sum of the previous extremum value of the extremum values and the hysteresis value being less than the current extremum value of the extremum values.

5. The method of claim 1, wherein:
   determining the extremum values comprises determining one of peak extremum values or valley extremum values.

6. The method of claim 1, comprising:
   generating the mechanical angle data based upon an angle sensor relative to one or more magnets attached to a shaft of the motor.

7. The method of claim 1, comprising:
   generating the electrical angle data based upon an angle sensor relative to one or more magnets attached to a rotor of the motor.

8. A motor controller configured to generate a drive signal for a motor comprising:
   a position interface configured to receive a first pulse indicative of a rotation of the motor and a second pulse indicative of an angular position of the motor;
   an encoder calibration unit configured to:
   set an encoder offset between the first pulse and a zero positon reference associated with the second pulse;
   determine extremum values of a phase current of the motor; and
   adjust the encoder offset based on the extremum values to generate an adjusted encoder offset;
   an angle and speed unit configured to determine an estimated motor position and an estimated motor speed based on the first pulse, the second pulse, and the adjusted encoder offset; and
   a pulse width modulation unit configured to generate a drive signal for the motor based on the estimated motor position and the estimated motor speed.

9. The motor controller of claim 8, wherein:
   the encoder calibration unit is configured to iterate the determining of the extremum values of the phase current and the adjusting of the encoder offset.

10. The motor controller of claim 8, wherein:
    the encoder calibration unit is configured to adjust the encoder offset by:
    incrementing the encoder offset responsive to a previous extremum value of the extremum values being greater than a current extremum value of the extremum values; and
    decrementing the encoder offset responsive to the previous extremum value of the extremum values being less than the current extremum value of the extremum values.

11. The motor controller of claim 8, wherein:
the encoder calibration unit is configured to adjust the encoder offset by:
incrementing the encoder offset responsive to a previous extremum value of the extremum values being greater than a sum of a current extremum value of the extremum values and a hysteresis value; and
decrementing the encoder offset responsive to a sum of the previous extremum value of the extremum values and the hysteresis value being less than the current extremum value of the extremum values.

12. The motor controller of claim 8, wherein:
the encoder calibration unit is configured to determine the extremum values by determining one of peak extremum values or valley extremum values.

13. The motor controller of claim 8, wherein:
the position interface is configured to receive the first pulse based upon an angle sensor relative to one or more magnets attached to a shaft of the motor.

14. The motor controller of claim 8, wherein:
the position interface is configured to receive the second pulse based upon an angle sensor relative to one or more magnets attached to a rotor of the motor.

15. A system, comprising:
a motor;
an angle sensor interfacing with the motor to generate a first pulse indicative of a rotation of the motor and a second pulse indicative of an angular position of the motor;
a motor controller, comprising:
an encoder calibration unit configured to:
set an encoder offset between the first pulse and a zero positon reference associated with the second pulse;
determine extremum values of a phase current of the motor; and
adjust the encoder offset based on the extremum values to generate an adjusted encoder offset;
an angle and speed unit configured to determine an estimated motor position and an estimated motor speed based on the first pulse, the second pulse, and the adjusted encoder offset; and
a pulse width modulation unit configured to generate a drive signal for the motor based on the estimated motor position and the estimated motor speed.

16. The system of claim 15, wherein:
the encoder calibration unit is configured to iterate the determining of the extremum values of the phase current and the adjusting of the encoder offset.

17. The system of claim 15, wherein:
the encoder calibration unit is configured to adjust the encoder offset by:
incrementing the encoder offset responsive to a previous extremum value of the extremum values being greater than a current extremum value of the extremum values; and
decrementing the encoder offset responsive to the previous extremum value of the extremum values being less than the current extremum value of the extremum values.

18. The system of claim 15, wherein:
the encoder calibration unit is configured to adjust the encoder offset by:
incrementing the encoder offset responsive to a previous extremum value of the extremum values being greater than a sum of a current extremum value of the extremum values and a hysteresis value; and
decrementing the encoder offset responsive to a sum of the previous extremum value of the extremum values and the hysteresis value being less than the current extremum value of the extremum values.

19. The system of claim 15, wherein:
the encoder calibration unit is configured to determine the extremum values by determining one of peak extremum values or valley extremum values.

20. The system of claim 15, wherein:
the angle sensor interfaces with one or more magnets attached to a shaft of the motor to generate the first pulse; and
the angle sensor interfaces with one or more magnets attached to a rotor of the motor to generate the second pulse.

* * * * *